(12) United States Patent
Johnson (10) Patent No.: US 6,476,708 B1
(45) Date of Patent: Nov. 5, 2002

(54) DETECTION OF AN RFID DEVICE BY AN RF READER UNIT OPERATING IN A REDUCED POWER STATE

(75) Inventor: David A. Johnson, Thornton, CO (US)

(73) Assignee: HID Corporation, Irvine, CA (US)

( * ) Notice: Subject to any disclaimer, the term of this patent is extended or adjusted under 35 U.S.C. 154(b) by 0 days.

(21) Appl. No.: 09/045,860

(22) Filed: Mar. 20, 1998

(51) Int. Cl.$^7$ .............................................. E05B 49/00
(52) U.S. Cl. ................. 340/10.34; 340/5.62; 340/572.4
(58) Field of Search .......................... 340/10.34, 10.33, 340/10.3, 10.1, 5.31, 5.61, 5.62, 5.63, 10.42, 572.1, 572.2, 572.4

(56) References Cited

U.S. PATENT DOCUMENTS

| | | | | |
|---|---|---|---|---|
| 3,859,624 A | * | 1/1975 | Kriofsky | 340/572.2 |
| 4,471,343 A | * | 9/1984 | Lemelson | 340/5.31 |
| 4,730,188 A | * | 3/1988 | Milheiser | 340/825 |
| 4,752,776 A | * | 6/1988 | Katzenstein | 340/10.42 |
| 5,523,746 A | * | 6/1996 | Gallagher | 340/5.61 |
| 5,973,611 A | * | 10/1999 | Kulha | 340/5.62 |

FOREIGN PATENT DOCUMENTS

| | | | | |
|---|---|---|---|---|
| GB | 2 237 427 A | | 5/1991 | ............ G07C/9/00 |
| GB | 2 278 631 A | | 4/1994 | ........... E05B/49/00 |
| WO | WO-98/01837 | * | 1/1998 | ................ 340/5.72 |

* cited by examiner

Primary Examiner—Edwin C. Holloway, III
(74) Attorney, Agent, or Firm—Rodney F. Brown (57) ABSTRACT

A method is provided for operating an RF transponder system to detect the presence of an RFID device in the proximal space of an RF reader unit having an excitation signal generator circuit and an RFID device detection circuit. The excitation signal generator circuit unit initially operates in a reduced power state, generating ring signals in response to a reduced electrical current and transmitting the ring signals into the proximal space. The RFID device detection circuit evaluates the ring signals to determine variations in an RFID device detection parameter. When the variations pass a variation threshold level due to the presence of the RFID device, the ring signals are terminated and the excitation signal generator circuit switches to an increased power state, wherein the excitation signal generator circuit generates an RF excitation signal which is transmitted to the RFID device.

16 Claims, 4 Drawing Sheets

DETECTION OF AN RFID DEVICE BY AN RF READER UNIT OPERATING IN A REDUCED POWER STATE

TECHNICAL FIELD

The present invention relates generally to operation of a radio frequency transponder system having a radio frequency reader unit and a radio frequency identification device and, more particularly, to a method of operating the radio frequency transponder system to detect the proximity of the radio frequency identification device to the radio frequency reader unit which is in a reduced power state.

BACKGROUND OF THE INVENTION

A radio frequency (RF) transponder system typically comprises an RF reader unit and a radio frequency identification (RFID) device. The RFID device is commonly termed an RFID tag. Operation of the RF transponder system is generally characterized by multiple operating modes including excitation, response and read modes. The RF transponder system requires electrical power to operate in each of these modes. In particular, the RF reader unit must be powered during the excitation and read modes while the RFID device must be powered during the response mode. In many conventional RF transponder systems the RFID device is a passive device, i.e., the RFID device lacks an internal power source or physical connection to an external power source. The passive RFID device is powered remotely by the RF reader unit while the RFID device is free of contact with the RF reader unit. An exemplary passive RFID device and its method of operation are disclosed in U.S. Pat. No. 4,730,188 to Milheiser. The RF reader unit is conventionally connected to an electrical power source, such as an ac power line, which powers the RF reader unit.

The present invention has identified the need for an RF reader unit, which is powered by a self-contained portable power source integral with the RF reader unit, such as a small disposable or rechargeable battery. This enables the user to position the RF reader unit in a remote location which lacks access to an ac power line or an ac power outlet. A battery, however, has a finite life necessitating replacement of the battery in the RF reader unit at the end of its useful life, which is both costly and time consuming. Accordingly, it is desirable to reduce the power demands on the battery of the RF reader unit during operation of the RF transponder system, thereby extending the useful life of the battery.

As such, a need exists for an effective method of operating an RF transponder system with a reduced electrical power demand. Accordingly, it is an object of the present invention to provide an RF transponder system operable at a reduced electrical power state. More particularly, it is an object of the present invention to provide a method of operating an RF transponder system in a power conserving manner, wherein the system transitions between a reduced power state and an increased power state as a function of the specific operating mode of the system. Still more particularly, it is an object of the present invention to provide such a method, wherein the RF transponder system has an effective RFID device detection mode of operation at a reduced power state and has excitation, response and read modes of operation at an increased power state. It is another object of the present method to provide such a method, wherein the power requirements of the RF transponder system are fully satisfied by a disposable or rechargeable battery residing in the RF reader unit of the system.

These objects and others are accomplished in accordance with the invention described hereafter.

SUMMARY OF THE INVENTION

The present invention is a method of operating an RF transponder system comprising an RF reader unit and a passive RFID device. The RF reader unit includes an excitation signal generator circuit, an excitation mode activation circuit coupled to the excitation signal generator circuit, an RFID device detection circuit coupled to the excitation mode activation circuit, and a power source for powering the electrical components of the RF reader unit. The excitation signal generator circuit is operable in either a reduced power state or an increased power state. When operating in the reduced power state, the excitation signal generator circuit enables generation of a plurality of ring signals which exhibit an RFID device detection parameter. When operating in the increased power state, the excitation signal generator circuit enables generation of an RF excitation signal which powers the RFID device. The excitation mode activation circuit, which is preferably a logic flip/flop switch, enables switching of the excitation signal generator circuit between the reduced power state and the increased power state in response to the RFID device detection parameter passing a variation threshold level. The RFID device detection circuit is operable in the reduced power state to determine when the RFID device detection parameter passes the variation threshold level. The power source is in the form of a small portable battery which provides reduced electrical current to the excitation signal generator circuit in the reduced power state and increased electrical current to the excitation signal generator circuit in the increased power state. The RFID device includes a transponder circuit which causes the RFID device detection parameter of the ring signals to pass the variation threshold level when the RFID device is positioned in a proximal space relative to the RF reader unit.

The present invention is more particularly a method of operating the RF transponder system to detect the presence of the RFID device in the proximal space of the RF reader unit. The method is initiated with the excitation signal generator circuit of the RF reader unit operating in a reduced power state which is effected by drawing reduced electrical current from the power source. The excitation signal generator circuit generates the ring signals in response to the reduced electrical current and transmits the ring signals into the proximal space. The RFID device detection circuit of the RF reader unit, which is in electrical communication with the excitation signal generator circuit, receives and evaluates the ring signals to determine variations in the RFID device detection parameter of the ring signals, such as variations in the decay rate or average voltage of the ring signals. When the variation in the RFID device detection parameter passes the variation threshold level due to the presence of the RFID device in the proximal space, the excitation mode activation circuit transitions the excitation signal generator circuit from the reduced power state to the increased power state and generation of the ring signals is terminated.

The excitation signal generator circuit draws increased electrical current from the power source in the increased power state to generate the RF excitation signal. The RF excitation signal is transmitted to the RFID device positioned in the proximal space, powering the transponder circuit of the RFID device. The ring signals and the RF excitation signal have substantially the same frequency which is substantially equal to the tuned frequency of the transponder circuit and the excitation signal generator circuit. The transponder circuit processes the RF excitation signal, generates an RF response signal in response to the RF excitation signal, and transmits the RF response signal to an ER circuit housed in the RF reader unit. The ER circuit, which includes the excitation signal generator and RFID device detection circuits, reads the RF response signal upon receipt. After the RF response signal is read; the excitation signal generator circuit is transitioned back to the reduced power state and generation of the ring signals resumes while generation of the RF excitation signal is terminated.

It is noted that the duty cycle of the excitation signal generator circuit is substantially lower when operating in the reduced power state than when operating in the increased power state. As a result, the life of the power source is substantially extended and more electrical power is available to the other operations of the RF transponder system.

The present invention will be further understood from the drawings and the following detailed description.

DESCRIPTION OF PREFERRED EMBODIMENT

Figure 1A:
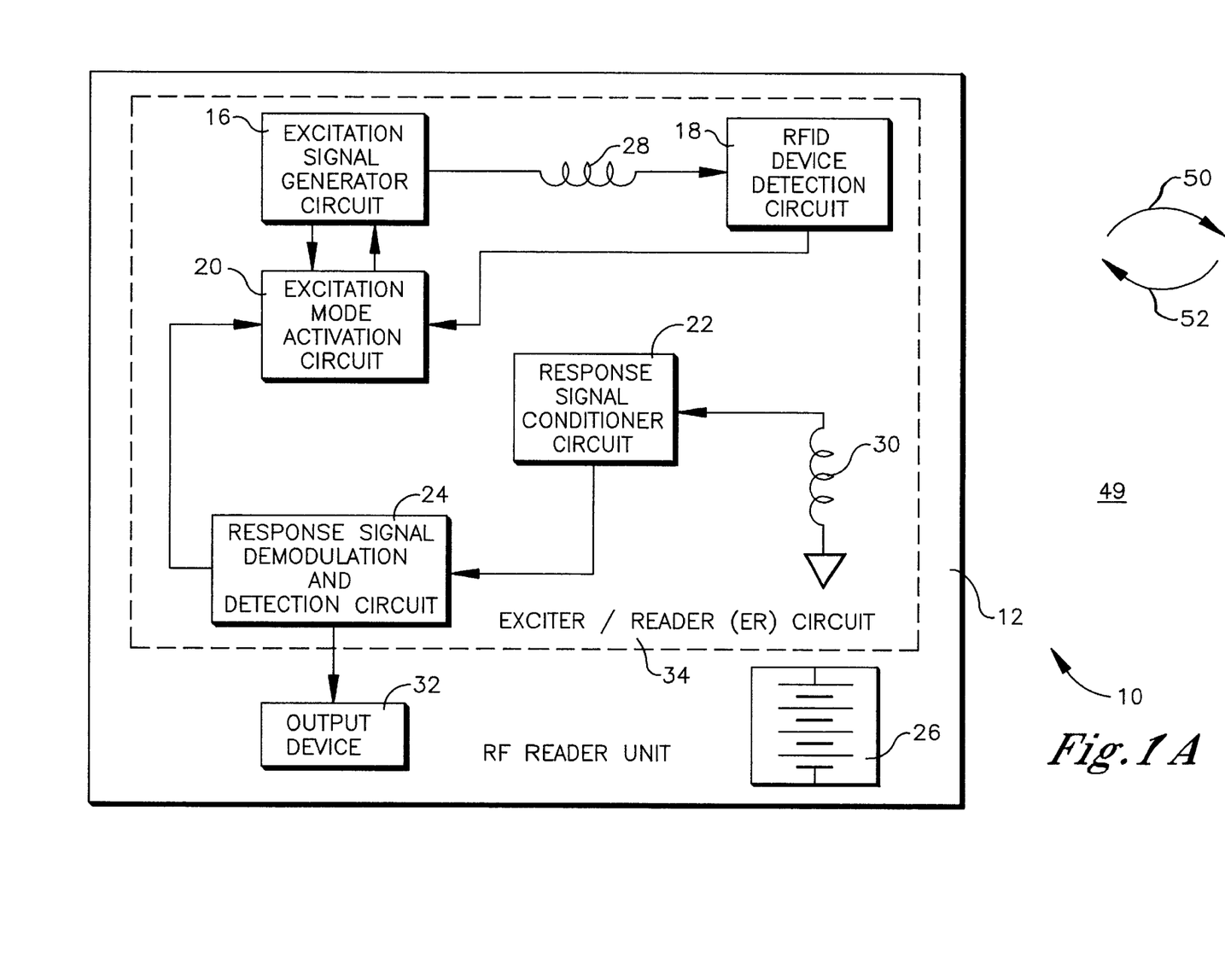
FIGS. 1A–B are a block diagram of an RF transponder system having utility in the practice of the present invention.
Figure 1B:
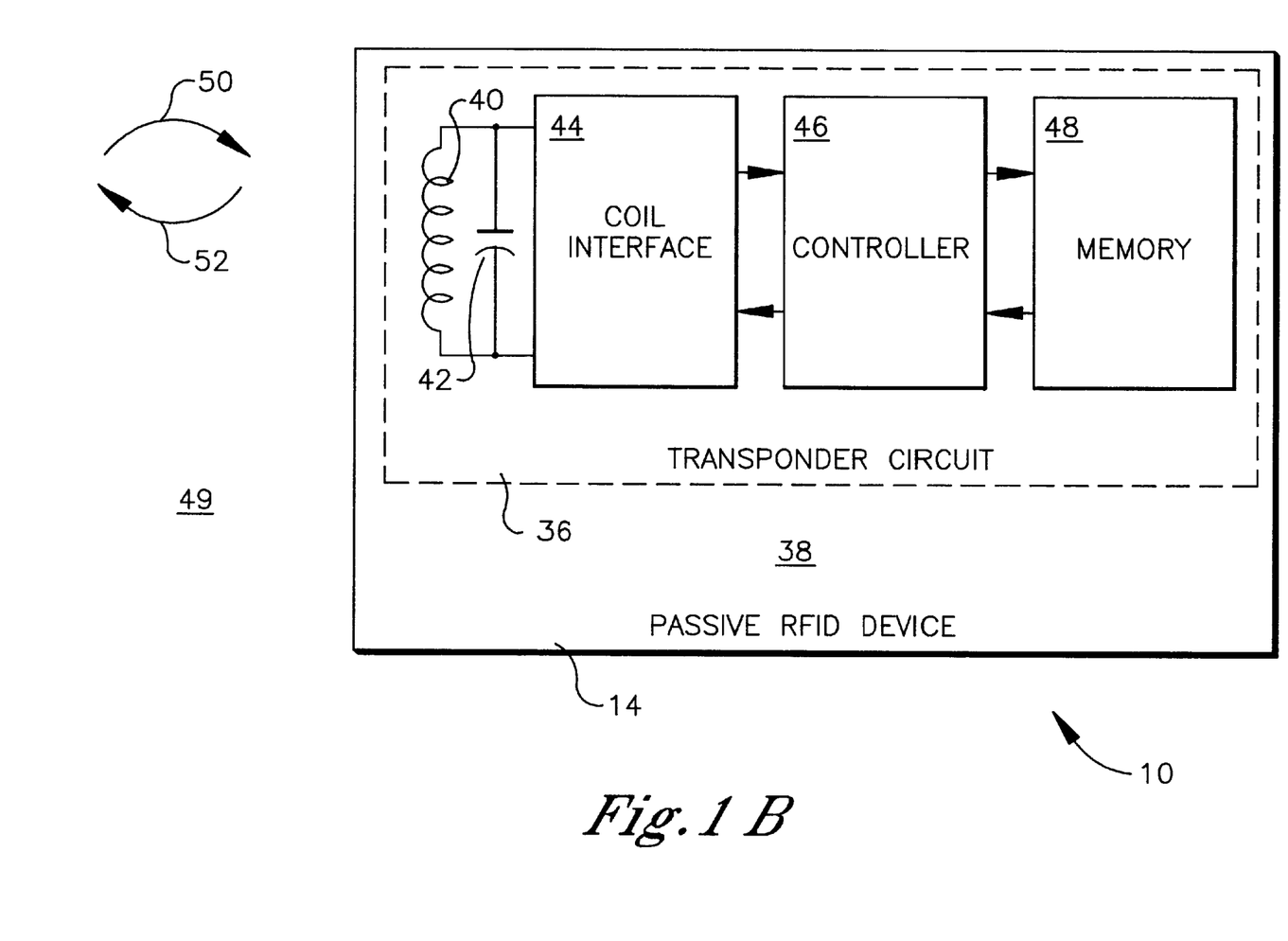

Referring initially to FIGS. 1A–B, an RF transponder system utilized in practicing the method of the present invention is shown and generally designated 10. The RF transponder system 10 comprises an RF reader unit 12 and a passive RFID device 14. The RF reader unit 12 includes an excitation signal generator circuit 16, an RFID device detection circuit 18, an excitation mode activation circuit 20, a response signal conditioner circuit 22, a response signal demodulation and detection circuit 24 and a power source 26. The power source 26 is typically a relatively small battery consisting of one or more disposable dry cells or rechargeable cells. The excitation signal generator circuit 16 includes a transmitter antenna coil 28 and the response signal conditioner circuit 22 includes a receiver antenna coil 30. An output device 32, such as a visual, audible or mechanical output, is coupled to the response signal demodulation and detection circuit 24. The circuits 16,18, 20,22,24 of the RF reader unit 12 in combination are termed an exciter/reader (ER) circuit 34. Skilled artisans can appreciate that the RF reader unit 12 can be adapted in accordance with the present invention to include a writer circuit (not shown) capable of writing programming instructions to the RFID device 14 by either contact or contactless means. The ER circuit 34 and writer circuit in combination are termed an exciter/reader/writer (ERW) circuit. Skilled artisans can further appreciate that the RF reader unit 12 can be adapted in accordance with the present invention to combine the functions of the transmitter antenna coil 28 and receiver antenna coil 30 in a single transmitter/receiver antenna coil.

The passive RFID device 14 includes a transponder circuit 36 mounted on a support 38 such as a card. As noted above, a passive RFID device having a transponder circuit mounted on a support is commonly termed an RFID tag. The transponder circuit 36 is a conventional circuit such as described in U.S. Pat. No. 4,730,188 to Milheiser, incorporated herein by reference. The transponder circuit 36 generally includes a transmitter/receiver antenna coil 40 and a capacitor 42 coupled to a coil interface 44. A controller 46 is coupled to the coil interface 44 and to a memory 48. Skilled artisans can appreciate that the RFID device 14 can be adapted in accordance with the present invention to separate the functions of the transmitter/receiver antenna coil 40 into separate transmitter and receiver antenna coils in the manner of the ER circuit 34.

The RF transponder system 10 has multiple modes of operation, including a detection mode, an excitation mode, a response mode and a read mode. The detection mode is the initial operating mode, wherein the RFID device 14 has a substantially passive function and the RF reader unit 12 has a substantially active function. The RF reader unit 12 employs the RFID device detection circuit 18 in cooperation with the excitation signal generator circuit 16 to actively seek detection of the RFID device 14 in a space 49 away from, but proximal to, the RF reader unit 12. When the RF reader unit 12 detects the RFID device 14 in the proximal space 49, the system 10 transitions the RF reader unit 12 to the excitation mode, wherein the excitation mode activation circuit 20 signals the excitation signal generator circuit 16 to generate an RF excitation signal 50. The RF excitation signal 50 is transmitted by the transmitter antenna coil 28 of the RF reader unit 12 and received by the transmitter/receiver antenna coil 40 of the RFID device 14. Upon receipt of the RF excitation signal 50, the system 10 transitions the RFID device 14 to the response mode, wherein the RFID device 14 is activated. When the RFID device 14 is in the response mode, the transponder circuit 36 generates an RF response signal 52, typically containing data associated with the RFID device 14, which is of interest to a user of the RF transponder system 10. The RF response signal 52 is transmitted by the transmitter/receiver antenna coil 40 of the RFID device 14 and is received by the receiver antenna coil 30 of the RF reader unit 12. The system 10 then transitions the RF reader unit 12 to the read mode, wherein the RF response signal 52 is processed by the ER circuit 34 and the data contained in the RF response signal 52 is communicated to the output device 32.

Figure 2:
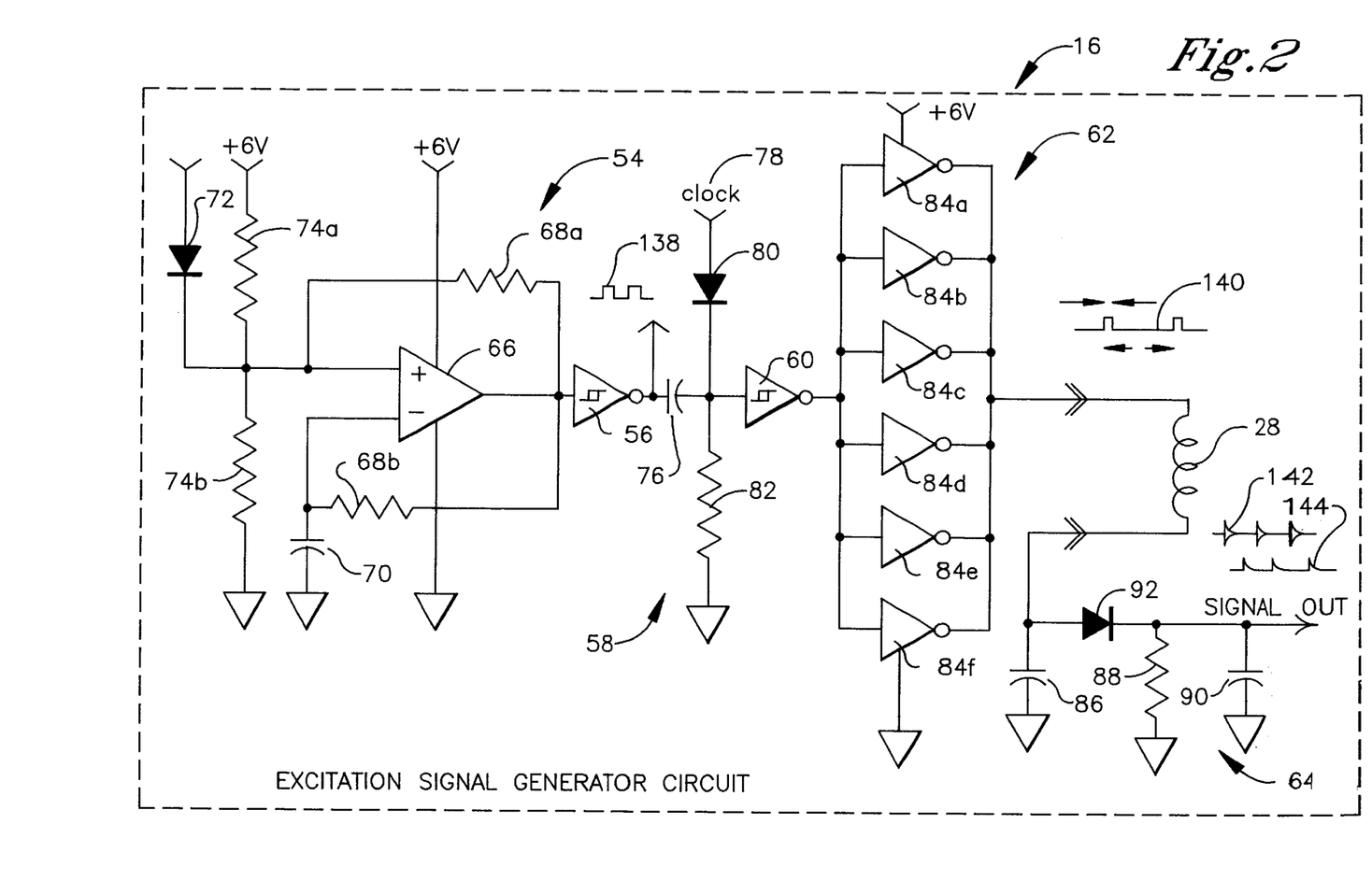
FIG. 2 is a schematic view of an excitation signal generator circuit positioned in the RF reader unit of FIGS. 1A–B and used in accordance with the method of the present invention.

The present invention is a specific method for performing the detection mode of operation, which enables the RF reader unit 12 to automatically detect whether the RFID device 14 is in the proximal space 49 while the system 10 is substantially in a reduced power state. Upon detection of the RFID device 14 in the proximal space 49, the system 10 transitions to an increased power state for the remaining excitation, response and read modes of operation. Referring to FIG. 2, the excitation signal generator circuit 16 employed in the practice of the present invention is shown in greater detail. The excitation signal generator circuit 16 comprises in sequence an oscillator 54, a first Schmitt trigger 56, a pulse shaping circuit 58, a second Schmitt trigger 60, an antenna coil driver circuit 62, the transmitter antenna coil 28, and a ring signal processing circuit 64. The oscillator 54 is an astable multivibrator including an amplifier 66, a pair of resistors 68a, 68b, and a capacitor 70. A diode 72 and a resistor pair 74a, 74b are positioned in the excitation signal generator circuit 16 ahead of the oscillator 54. The pulse shaping circuit 58 includes a capacitor 76, a clock 78, a diode 80 and a resistor 82. The antenna coil driver circuit 62 includes a plurality of inverters 84a, 84b, 84c, 84d, 84e, 84f positioned in parallel. The ring signal processing circuit 64 has an RC network which includes a first capacitor 86, a resistor 88 and a second capacitor 90 in series. The ring signal processing circuit 64 also has a diode 92.

Figure 3:
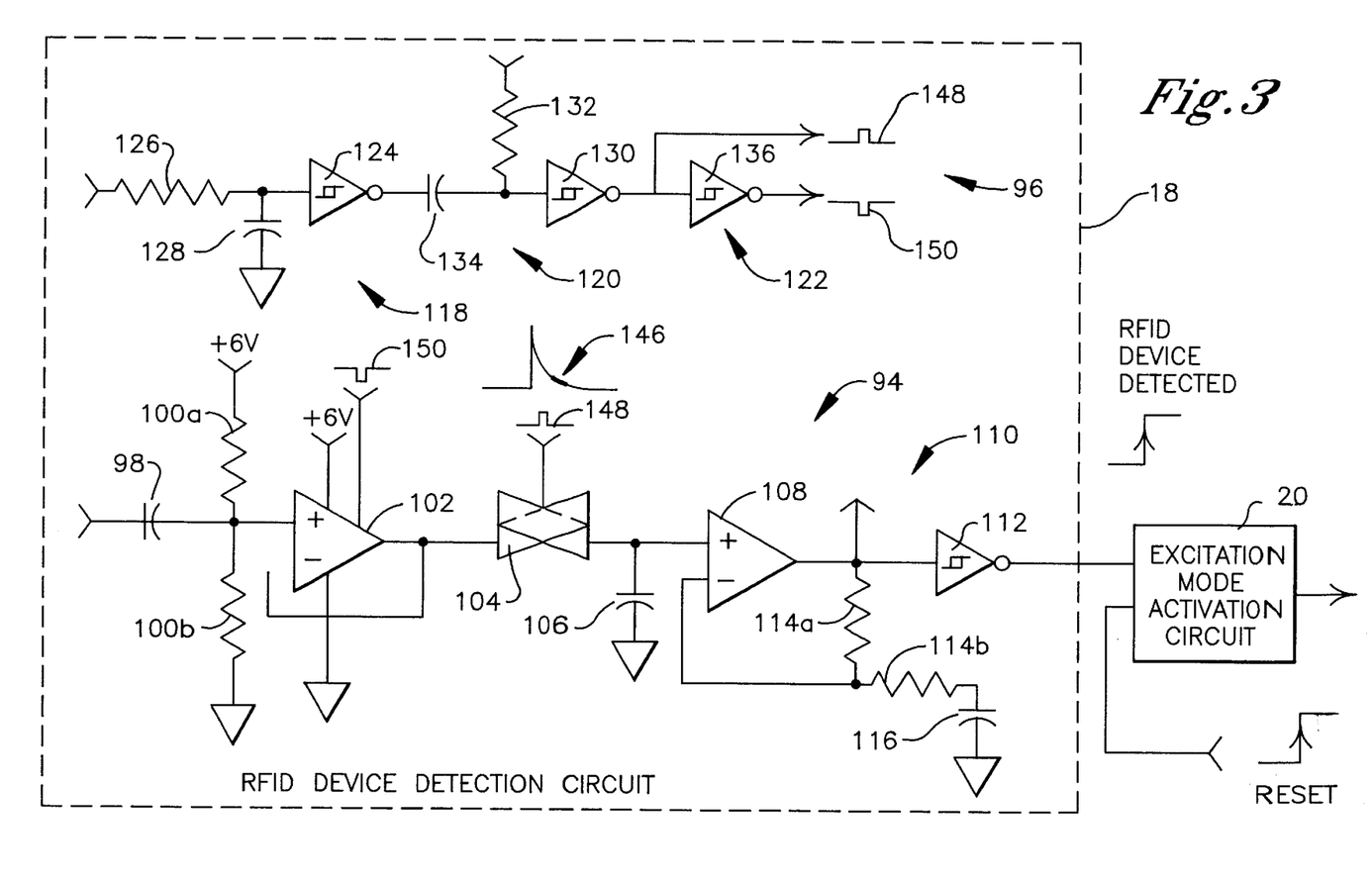
FIG. 3 is a schematic view of an RFID device detection circuit and an excitation mode activation circuit positioned in the RF reader unit of FIGS. 1A–B and used in accordance with the method of the present invention.

Referring to FIG. 3, the RFID device detection circuit 18 and excitation mode activation circuit 20 of FIGS. 1A–B employed in the practice of the present invention are shown in greater detail. The RFID device detection circuit 18 of FIGS. 1A–B comprises a sample and hold circuit 94 and a timing circuit 96. The sample and hold circuit 94 comprises in sequence a capacitor 98, a pair of unbalanced biasing resistors 100a, 100b, a first operational amplifier 102, an analog switch 104, a storage capacitor 106, a second operational amplifier 108, a ring signal change circuit 110 and a CMOS Schmitt trigger 112. The ring signal change circuit 110 includes a pair of resistors 114a, 114b and a capacitor 116. The timing circuit 96 comprises a sample time delay generator 118, a positive sample length pulse generator 120 and a negative sample length pulse generator 122. The sample time delay generator 118 is a first Schmitt trigger 124 positioned after a resistor 126 and a capacitor 128. The positive sample length pulse generator 120 is a second Schmitt trigger 130 positioned after a resistor 132 and a capacitor 134. The negative sample length pulse generator 122 is a third Schmitt trigger 136. The preferred excitation mode activation circuit 20 is a logic flip/flop switch as shown.

The method of the present invention is described hereafter with reference to FIGS. 1A–B, 2 and 3. The detection mode of operation is characterized below by numerous operating parameters, but the present invention is not limited to any specific values for these parameters. The specific values or ranges of values for the operating parameters provided in the following description exemplify a preferred embodiment of the invention.

Referring initially to FIGS. 1A–B, the RF transponder system 10 automatically initiates the detection mode of operation upon powering the system 10 and continuously maintains the detection mode of operation as long as no RFID device 14 is in the proximal space 49 of the RF reader unit 12. Referring additionally to FIG. 2 in conjunction with FIGS. 1A–B, the detection mode is powered by drawing a reduced electrical current from the power source 26 to the oscillator 54. The reduced electrical current demand on the power source 26 during the detection mode of operation is generally in the range of about 10 to about 30 microamps. A preferred power source 26 is a battery of 4 AA cells constituting a stored energy value of 1 amphr with a potential of 6 V. A representative value of the total current drain from the power source 26 is 40 microamps at 6 V, which corresponds to an extended battery life of 1 year. The oscillator 54 produces the ring generating pulses at a selected ring generating pulse rate which is sufficiently high to enable rapid detection of a nearby RFID device 14 in the manner described herein. An exemplary selected ring generating pulse rate is 50 Hz. The ring generating pulses pass through the first Schmitt trigger 56 where the ring generating pulses are formed into square waves designated 138, as shown in FIG. 2 downstream of the first Schmitt trigger 56. The square-waved ring generating pulses 138 are routed through the pulse shaping circuit 58 and the antenna coil driver circuit 62, which optimize the shape of the ring generating pulses to a selected width. The second Schmitt trigger 60 is provided between the pulse shaping circuit 58 and the antenna coil driver circuit 62 as a buffer to maintain the shape of the ring generating pulses in the pulse shaping circuit 58. The optimized ring generating pulses 140 have an appearance as shown in FIG. 2 downstream of the antenna coil driver circuit 62.

The optimal pulse width of the shaped ring generating pulse 140 is preferably selected as a function of the frequency to which the LC networks of the excitation signal generator circuit 16 and transponder circuit 36, respectively, are tuned. For example, the LC networks of the circuits 16, 36 are conventionally tuned to a frequency of 125 KHz. An exemplary optimal selected pulse width is 2 microseconds which is sufficient to drive the transmitter antenna coil 28, yet advantageously results in reduced power consumption from the power source 26.

The ring generating pulses 140 are routed to the transmitter antenna coil 28, where each pulse causes the voltage appearing across the coil 28 to produce a ring signal at a frequency which is a function of the tuned LC network of the excitation signal generator circuit 16, i.e., the transmitter antenna coil 28 and the capacitor 70. As noted above, an exemplary value of the tuned frequency is 125 KHz. The ring signals 142 have an appearance as shown in FIG. 2 downstream of the transmitter antenna coil 28. Each ring signal 142 is routed through the ring signal processing circuit 64 where the ring signal is rectified and filtered. Filtering and rectifying removes the majority of the high frequency components from the ring signal, leaving only the positive portion of the ring signal waveform. The filtered ring signals 144 have an appearance as shown in FIG. 2 downstream of the ring signal processing circuit 64. The filtered ring signals 144 constitute the output of the excitation signal generator circuit 16 when the RF transponder system 10 is in the detection mode of operation.

The filtered ring signals 144 from the excitation signal generator circuit 16 are input to the RFID device detection circuit 18 for evaluation. In particular, referring to FIG. 3, the output of the excitation signal generator circuit 16 is input to the sample and hold circuit 94 which evaluates samples of the filtered ring signals 144 in accordance with sampling parameters dictated by the timing circuit 96. The specific sampling parameters dictated by the timing circuit 96 are the position on the waveform of the filtered ring signal 144 where the sample is taken, termed the "time delay", and the total length of the sample, termed the "sample length". An exemplary sample 146 of the filtered ring signal has an appearance as shown in FIG. 3. The values of the sampling parameters are defined by periodic sample length pulses created by the timing circuit 96.

The timing circuit 96 receives input pulses from the oscillator 54 of the excitation signal generator circuit 16, which are substantially identical to the ring generating pulses outputted from the oscillator 54 to the first Schmitt trigger 56. The sample time delay generator 118 delays routing each input pulse of the timing circuit 96 to the positive sample length pulse generator 120 by a selected time delay after the onset of the corresponding ring signal. An exemplary time delay is 200 microseconds. The delayed input pulse is routed to the positive sample length pulse generator 120 and the negative sample length pulse generator 122, which generate a positive sample length pulse and a negative sample length pulse, respectively, in response to the delayed input pulse. Exemplary positive and negative sample length pulses 148, 150, each with a sample length of 20 microseconds, have an appearance as shown in FIG. 3 at the output of the timing circuit 96.

Operation of the sample and hold circuit 94 proceeds upon receipt of the filtered ring signals 144 from the excitation signal generator circuit 16. The voltage of the ring signals are biased by the unbalanced biasing resistors 100a, 100b. For example, the unbalanced biasing resistors 100a, 100b reduce a typical voltage of a ring signal from 10 V to 4 V. The biased ring signal and the negative sample length pulse 150 from the timing circuit 96 are both routed to the first operational amplifier 102. The negative sample length pulse 150 is amplified by the amplifier 102 for the duration of the sample length, thereby outputting a sample signal from the amplifier 102 in response to the biased ring signal and negative sample length pulse 150. An exemplary gain of the amplifier 102 is ×100. This increase enables the sample and hold circuit 94 to route the sample signal through the closed analog switch 104 and rapidly charge the storage capacitor 106, while drawing increased electrical current from the power source 26 for only a very short time equal to the sample length. Closing of the analog switch 104 in synchronization with high speed operation of the amplifier 102 is enabled by routing the positive sample length pulse 148 from the timing circuit 96 to the analog switch 104. It is noted that when the first operational amplifier 102 is operating at its lower speed, the amplifier 102 performs a signal buffering function.

The sample signal delivered to the storage capacitor 106 is retained for transmission to the second operational amplifier 108. The second operational amplifier 108 provides a buffer between the storage capacitor 106 and the ring signal change circuit 110. The second operational amplifier 108 also has a gain which magnifies any changes in the voltage of the sample signal received by the amplifier 108. Such changes correspond to changes in the filtered ring signal 144. The amplified sample signal is outputted from the amplifier 108 and routed to the Schmitt trigger 112, which has an upper voltage threshold level and a lower voltage threshold level. An exemplary upper voltage threshold level is 4 V and an exemplary lower voltage threshold level is 2 V. When a signal, which is being inputted to the Schmitt trigger 112, changes from a level above the upper voltage threshold level to a level below the lower voltage threshold level, the signal change effects a change in the output state of the Schmitt trigger 112. The gain of the second operational amplifier 108 is selected to ensure that a change in the filtered ring signal 144 will produce a change of sufficient magnitude in the amplified sample signal to effect a change in the output state of the Schmitt trigger 112. An exemplary gain of the amplifier 108 is ×40.

Detection of an RFID device 14 by the RF reader unit 12 is enabled by the fact that the ring signal has a characteristic slow decay rate which is substantially constant within the LC network of the excitation signal generator circuit 16 when no RFID device 14 is in the proximal space 49 of the RF reader unit 12. The slow decay rate is attributable to the relatively high Q value of the LC network. For example, the Q value of the LC network is preferably in a range from about 40 to about 100. The number of cycles for which the 125 KHz ring signal lasts before substantially decaying roughly corresponds to the Q value of the LC network. Thus, a typical 125 KHz ring signal substantially decays after about 100 cycles when the LC network has a Q value of about 100.

When an RFID device 14, having a transponder circuit 36 which is tuned to the same frequency as the excitation signal generator circuit 16, is brought into the proximal space 49 of the RF reader unit 12, the RFID device 14 absorbs a substantial portion of the energy from the ring signal causing the ring signal to decay at a substantially faster rate within the LC network of the excitation signal generator circuit 16. As a result, the ring signal will exhibit a lower voltage at a given time delay when the RFID device 14 is in the proximal space 49 than when no RFID device 14 is present in the proximal space 49. The amplified sample signal exhibits a corresponding change, which effects a change in the output state of the Schmitt trigger 112 in the manner set forth above. An exemplary change in the voltage of the amplified signal is from 5 V with the RFID device 14 absent from the proximal space 49 to 1 V with the RFID device 14 present in the proximal space 49.

In general, the sensitivity of the RF reader unit 12 to the presence of the RFID device 14 in the proximal space 49 increases directly with the increasing Q value of the LC network. Thus, the sensitivity of the RF reader unit 12 is a function of the specific design of the excitation signal generator circuit 16 and in particular the LC network. The sensitivity of the RF reader unit 12 is also a function of the specific design of the RFID device detection circuit 18. Accordingly, it is within the purview of the skilled artisan to construct an RF reader unit 12 having a desired sensitivity for the purpose of practicing the present method by employing the teaching herein. An RF reader unit 12 capable of detecting an RFID device 14 in a proximal space 49 having a radius of about 4 inches from the transmitter antenna coil 28 of the RF reader unit 12 is generally sufficient for most conventional applications, although greater radii up to 12 inches or more are possible within the scope of the present invention.

The excitation mode activation circuit 20, shown in FIG. 3 as the flip/flop switch, is coupled to the output of the Schmitt trigger 112. Accordingly, the flip/flop switch 20 receives an activation signal outputted from the Schmitt trigger 112 which corresponds to the change in the output state of the Schmitt trigger 112. As noted above, the output state of the Schmitt trigger 112 changes when a predetermined voltage threshold level is passed, indicating a substantially faster decay rate of the ring signal. The flip/flop switch 20 effectively toggles the RF transponder system 10 between the reduced power state and the increased power state. Specifically, the flip/flop switch 20 communicates a state change to the excitation signal generator circuit 16 upon receipt of the activation signal, thereby transitioning the excitation signal generator circuit 16 to the excitation mode of operation. The excitation signal generator circuit 16 generates an RF excitation signal 50 during the excitation mode by routing 125 KHz square wave signals to the antenna coil drive circuit 62 through the diode 80. The RF excitation signal 50 having the form of a continuous 125 KHz sine wave is generated across the transmitter antenna coil 28 in response to the square wave signals. The flip/flop switch 20 also produces a logic signal that is routed through the diode 72 to disable the oscillator 54 and discontinue the ring generating pulses. The excitation mode of operation requires the increased power state, wherein the excitation signal generator circuit 16 draws increased electrical current from the power source 26. The increased electrical current demand on the power source 26 is generally about 60 milliamps.

After transitioning to the excitation mode, operation of the RF transponder system 10 continues through the response and read modes, which typically also require operation in the increased power state. Completion of the excitation, response and read modes is communicated to the flip/flop switch 20 which automatically resets, returning the RF transponder system 10 to the detection mode of operation at the reduced power state, which is the default mode of operation for the RF transponder system 10. Return of the RF transponder system 10 to the detection mode of operation is preferably time delayed after the flip/flop switch 20 resets to permit dissipation of the RF excitation signals 50, which could otherwise interfere or obscure the ring signals.

The flip/flop switch 20 has been described above and shown in FIGS. 1A–B as being directly coupled to the excitation signal generator circuit 16, enabling communication therebetween. In accordance with an alternate embodiment, however, it may be desirable to utilize a microcomputer (not shown), including a microprocessor, provided in the ER circuit 34, as an interface between the flip/flop switch 20 and the excitation signal generator circuit 16 and as an interface between the flip/flop switch 20 and the response signal demodulation and detection circuit 24. The microprocessor serves as a controller to communicate operating instructions to the excitation signal generator and response signal demodulation and detection circuits 16, 24 in response to the state of the flip/flop switch 20. Conversely, the microprocessor communicates state instructions to the flip/op switch 20 in response to the operational activities of the excitation signal generator and response signal demodulation and detection circuits 16, 24. A microcomputer conventionally contained in the response signal demodulation and detection circuit 24 can be employed to perform these functions.

Practice of the present method advantageously results in a substantially shortened duty cycle of the RF transponder system 10 during the detection mode of operation relative to the duty cycle of the system 10 during the excitation mode of operation. The duty cycle is defined herein as the percentage of the total system operating time that the excitation signal generator circuit 16 actively draws electrical current from the power source 26. In an exemplary case, the oscillator 54 of the excitation signal generator circuit 16 draws the bulk of the electrical current from the power source 26 while in the detection mode. The oscillator 54 is active for 2 microsecond periods to produce ring generating pulses at a frequency of 50 Hz. Under these conditions the duty cycle of the detection mode is calculated as 0.01%. By comparison, the antenna coil driver circuit 62 of the excitation signal generator circuit 16 typically draws the bulk of the electrical current from the power source 26 while in the excitation mode. The antenna coil driver circuit 62 is active for 4 microsecond periods to produce the excitation signal at a frequency of 125 KHz. The duty cycle of the excitation mode is calculated as 50%. In the above-recited example, the duty cycle of the detection mode is 5000 times lower than the duty cycle of the excitation mode. As a result, the detection mode places relatively little electrical current demand on the power source 26.

Where the power source 26 of the RF transponder system 10 is a conventional battery, the present method substantially extends the life of the power source 26 and renders substantially more electrical power available to the other operational modes of the RF transponder system 10. The present method also renders substantially more electrical power available to the output device 32, which can be a significant energy consumer. In one common application of the RF transponder system 10, the output device 32 functions as a door unlocking mechanism. By maintaining the electrical current demand of the system 10 very low in the detection mode, substantially more door unlocking operations can be performed by the output device 32 during the life of the power source 26.

The present invention has been described above in accordance with a preferred embodiment, wherein a specific signal processing technique termed a sample and hold technique is used to determine a variation in an RFID device detection parameter of the ring signal. The sample and hold technique evaluates the decay rate of the ring signal wave form as the primary RFID device detection parameter to indicate the presence of the RFID device 14 in the proximal space 49 of the RF reader unit 12. It is apparent, however, that the skilled artisan can modify the RFID device detection circuit 18 within the scope of the present invention, thereby enabling use of other signal processing techniques to evaluate alternate RFID device detection parameters which likewise indicate the presence of the RFID device 14 in the proximal space 49. For example, it is within the purview of the skilled artisan following the precepts of the present invention to modify the RFID device detection circuit 18, thereby enabling use of a voltage averaging technique rather than the above-described sample and hold technique to determine the presence of the RFID device 14 in the proximal space 49. An appropriately modified RFID device detection circuit performs the voltage averaging technique by determining the running average voltage of the ring signal which corresponds to the area under the curve of the ring signal wave form. The RFID device detection circuit amplifies and monitors changes in the average voltage. As in the manner of the sample and hold technique, a sudden and substantial change in the average voltage of the ring signal indicates the presence of the RFID device 14 in the proximal space 49 of the RF reader unit 12.

While the forgoing preferred embodiments of the invention have been described and shown, it is understood that alternatives and modifications, such as those suggested and others, may be made thereto and fall within the scope of the invention.

I claim:

1. A method for detecting an RFID device in the presence of an RF reader unit comprising:

a) providing an RF reader unit having an excitation signal generating function, a pulse generating function, a sample timing function, and a ring signal sampling function, wherein each function has an operative mode, and wherein said pulse generating function and said ring signal sampling function is each selectively transitionable between a power consumption state and a power conservation state when in said operative mode, and further wherein said excitation signal generating function, said pulse generating function and said ring signal sampling function is each selectively transitionable between said operative mode and an inoperative mode;

b) generating first and second ring-generating pulses while said pulse generating function of said RF reader unit is in said operative mode and said excitation signal generating function of said RF reader unit is in said inoperative mode, wherein said second ring-generating pulse is generated only after a time interval has elapsed from generation of said first ring-generating pulse, and wherein said first and second ring-generating pulses each have a pulse width corresponding to a ring-generating pulse time, said time interval being long relative to said ring-generating pulse time and said pulse generating function being in said power conservation state throughout said time interval except for the duration of said ring-generating pulse time when said pulse generating function is in said power consumption state;

c) applying said first and second ring-generating pulses to an antenna, wherein said first ring-generating pulse generates a first ring signal series in said antenna exhibiting a first decay rate of said first ring-generating pulse and said second ring-generating pulse generates a second ring signal series in said antenna exhibiting a second decay rate of said second ring-generating pulse, each succeeding ring signal in said first ring signal series having a lower energy level than each preceding ring signal and each succeeding ring signal in said second ring signal series having a lower energy level than each preceding ring signal;

d) generating first and second sample pulses while said sample timing function is in said operative mode, wherein generation of said first and second sample pulses is each delayed a delay time after generation of said first and second ring-generating pulses, respectively, and wherein said first and second sample pulses each has a sample length corresponding to a sample pulse time, said time interval being long relative to said sample pulse time;

e) obtaining a first sample signal series from said first ring signal series in said antenna and obtaining a second sample signal series from said second ring signal series in said antenna while said ring signal sampling function is in said operative mode, wherein said first sample signal series is obtained in correspondence with generation of said first sample pulse and has said sample pulse time and said second sample signal series is obtained in correspondence with generation of said second sample pulse and has said sample pulse time, said ring signal sampling function being in said power conservation state throughout said time interval except for the duration of said sample pulse time when said ring signal sampling function is in said power consumption state;

f) comparing each succeeding sample signal in said first sample signal series to a preceding sample signal in said first sample signal series to determine said first decay rate and comparing each succeeding sample signal in said second sample signal series to a preceding sample signal in said second sample signal series to determine said second decay rate; and g) comparing said first and second decay rates and transitioning said pulse generating function to said inoperative mode and said excitation signal generating function to said operative mode when a difference between said first and second decay rates series exceeds a threshold level caused by the presence of an RFID device in a proximal space of said RF reader unit while maintaining said pulse generating function in said operative mode and said excitation signal generating function in said inoperative mode when said difference between said first and second decay rates does not exceed said threshold level caused by the absence of said RFID device in said proximal space.

2. The method of claim 1, wherein said second ring-generating pulse has substantially identical properties to said first ring-generating pulse.

3. The method of claim 1, wherein said RF reader unit has a duty cycle and said duty cycle is substantially lower when said pulse generating function is in said operative mode and said excitation signal generating function is in said inoperative mode than when said pulse generating function is in said inoperative mode and said excitation signal generating function is in said operative mode.

4. The method of claim 1 further comprising transmitting an RF excitation signal to said RFID device in said proximal space when said excitation signal generating function is in said operative mode and processing said RF excitation signal in a transponder circuit of said RFID device.

5. The method of claim 4 further comprising generating an RF response signal in said RFID device in response to said RF excitation signal, transmitting said RF response signal to said RF reader unit and reading said RF response signal.

6. The method of claim 5 further comprising transitioning said pulse generating function to said operative mode and said excitation signal generating function to said inoperative mode after reading said RF response signal.

7. The method of claim 1 further comprising in step d) generating first and second timing pulses corresponding to said first and second ring-generating pulses, respectively, and generating said first and second sample pulses in response to said first and second timing pulses, respectively, wherein generation of said first sample pulse is delayed said delay time after said first timing pulse and generation of said second sample pulse is delayed said delay time after said second timing pulse.

8. The method of claim 1 further comprising:
repeating steps a)–d) to generate a third ring-generating pulse, a third ring signal series, and a third sample pulse and to obtain a third sample signal series when said difference between said first and second decay rates does not exceed said threshold level;
comparing each succeeding sample signal in said third sample signal series to a preceding sample signal in said third sample signal series to determine a third decay rate of said third ring-generating pulse; and
comparing said second and third decay rates and transitioning said pulse generating function to said inoperative mode and said excitation signal generating function to said operative mode when a difference between said second and third decay rates exceeds said threshold level caused by the presence of said RFID device in said proximal space while maintaining said pulse generating function in said operative mode and said excitation signal generating function in said inoperative mode when said difference between said second and third decay rates does not exceed said threshold level caused by the absence of said RFID device in said proximal space.

9. The method of claim 1, wherein said delay time is less than said time interval.

10. A method for detecting an RFID device in the presence of an RF reader unit comprising:
a) providing an RF reader unit having a pulse generating function, a ring signal sampling function, and a sample timing function;
b) generating first and second ring-generating pulses with said pulse generating function, wherein said second ring-generating pulse is generated only after a time interval has elapsed from generation of said first ring-generating pulse, and wherein said first and second ring-generating pulses each has a pulse width corresponding to a ring-generating pulse time, said time interval being long relative to said ring-generating pulse time;
c) applying said first and second ring-generating pulses to an antenna, wherein said first ring-generating pulse generates a first ring signal series in said antenna exhibiting a first decay rate of said first ring-generating pulse and said second ring-generating pulse generates a second ring signal series in said antenna exhibiting a second decay rate of said second ring-generating pulse, each succeeding ring signal in said first ring signal series having a lower energy level than each preceding ring signal and each succeeding ring signal in said second ring signal series having a lower energy level than each preceding ring signal;
d) generating first and second timing pulses with said sample timing function, wherein said first and second timing pulses correspond to said first and second ring-generating pulses, respectively, and generating first and second sample pulses in response to said first and second timing pulses, respectively, wherein generation of said first and second sample pulses is each delayed a delay time after said first and second timing pulse, respectively, and wherein said first and second sample pulse each has a sample length corresponding to a sample pulse time, said time interval being long relative to said sample pulse time;

e) obtaining a first sample signal series from said first ring signal series in said antenna and obtaining a second sample signal series from said second ring signal series in said antenna with said ring signal sampling function, wherein said first sample signal series is obtained in correspondence with generation of said first sample pulse and has said sample pulse time and said second sample signal series is obtained in correspondence with generation of said second sample pulse and has said sample pulse time;

f) comparing each succeeding sample signal in said first sample signal series to a preceding sample signal in said first sample signal series to determine said first decay rate and comparing each succeeding sample signal in said second sample signal series to a preceding sample signal in said second sample signal series to determine said second decay rate; and g) comparing said first and second decay rates and transitioning said pulse generating function to said inoperative mode when a difference between said first and second decay rates exceeds a threshold level caused by the presence of an RFID device in a proximal space of said RF reader unit while maintaining said pulse generating function in said operative mode when said difference between said first and second decay rates does not exceed said threshold level caused by the absence of said RFID device in said proximal space.

11. The method of claim 10, wherein said RF reader unit has an excitation signal generating function, said method further comprising transitioning said excitation signal generating function to an operative mode when said difference between said first and second decay rates exceeds said threshold level while maintaining said excitation signal generating function in an inoperative mode when said difference between said first and second decay rates does not exceed said threshold level.

12. The method of claim 10 further comprising:
repeating steps a)–d) to generate a third ring-generating pulse, a third ring signal series, a third timing pulse, and a third sample pulse and to obtain a third sample signal series when said difference between said first and second decay rates does not exceed said threshold level;
comparing each succeeding sample signal in said third sample signal series to a preceding sample signal in said third sample signal series to determine a third decay rate of said third ring-generating pulse; and
comparing said second and third decay rates and transitioning said pulse generating function to said inoperative mode when a difference between said second and third decay rates exceeds said threshold level caused by the presence of said RFID device in said proximal space while maintaining said pulse generating function in said operative mode when said difference between said second and third decay rates does not exceed said threshold level caused by the absence of said RFID device in said proximal space.

13. A method for detecting an RFID device in the presence of an RF reader unit comprising:
a) generating first and second ring-generating pulses, wherein said second ring-generating pulse is generated only after a time interval has elapsed from generation of said first ring-generating pulse, and wherein said first and second ring-generating pulses each has a pulse width corresponding to a ring-generating pulse time, said time interval being long relative to said ring-generating pulse time;

b) applying said first and second ring-generating pulses to an antenna, wherein said first ring-generating pulse generates a first ring signal series in said antenna exhibiting a first decay rate of said first ring-generating pulse and said second ring-generating pulse generates a second ring signal series in said antenna exhibiting a second decay rate of said second ring-generating pulse, each succeeding ring signal in said first ring signal series having a lower energy level than each preceding ring signal and each succeeding ring signal in said second ring signal series having a lower energy level than each preceding ring signal;

c) generating first and second sample pulses, wherein generation of said first and second sample pulses is each delayed a delay time after generation of said first and second ring-generating pulse, respectively, and wherein said first and second sample pulses each has a sample length corresponding to a sample pulse time, said time interval being long relative to said sample pulse time;

d) obtaining a first sample signal series from said first ring signal series in said antenna and obtaining a second sample signal series from said second ring signal series, wherein said first sample signal series is obtained in correspondence with generation of said first sample pulse and has said sample pulse time and said second sample signal series is obtained in correspondence with generation of said second sample pulse and has said sample pulse time;

e) comparing each succeeding sample signal in said first sample signal series to a preceding sample signal in said first sample signal series to determine said first decay rate and comparing each succeeding sample signal in said second sample signal series to a preceding sample signal in said second sample signal series to determine said second decay rate; and f) comparing said first and second decay rates and terminating generation of subsequent ring-generating pulses when a difference between said first and second decay rates exceeds a threshold level caused by the presence of an RFID device in a proximal space of an RF reader unit while repeating steps a)–d) to generate a third ring-generating pulse, a third ring signal series, a third sample pulse, and a third sample signal series when said difference between said first and second decay rates does not exceed said threshold level caused by the absence of said RFID device in said proximal space.

14. The method of claim 13 further comprising:
comparing each succeeding sample signal in said third sample signal series to a preceding sample signal in said third sample signal series to determine a third decay rate of said third ring-generating pulse; and
comparing said second and third decay rates and terminating generation of subsequent ring-generating pulses when a difference between said second and third decay rates exceeds said threshold level caused by the presence of said RFID device in said proximal space.

15. An RF reader unit comprising:

means for generating ring-generating pulses, wherein each succeeding ring-generating pulse is generated only after a time interval has elapsed from generation of a preceding ring-generating pulse, and wherein each ring-generating pulse has a pulse width corresponding to a ring-generating pulse time, further wherein said time interval is long relative to said ring-generating pulse time, said ring-generating pulse generating means is selectively transitionable between an operative mode and an inoperative mode and is selectively transitionable between a power consumption state and a power conservation state when in said operative mode, said ring-generating pulse generating means being in said power conservation state throughout said time interval except for the duration of said ring-generating pulse time when said ring-generating pulse generating means is in said power consumption state;

means for applying said ring-generating pulses to an antenna, wherein each ring-generating pulse generates a ring signal series in said antenna exhibiting a decay rate of said ring-generating pulse, thereby generating a plurality of ring signal series each exhibiting a decay rate of a ring-generating pulse, and wherein each succeeding ring signal in each ring signal series has a lower energy level than each preceding ring signal;

means for generating sample pulses, wherein generation of each sample pulse is delayed a delay time after generation of each ring-generating pulse, and wherein each sample pulse has a sample length corresponding to a sample pulse time, said time interval being long relative to said sample pulse time;

means for obtaining a first sample signal series from a first ring signal series in said antenna and obtaining a second sample signal series from a second ring signal series in said antenna, each sample signal in said first or second sample signal series obtained in correspondence with generation of each sample pulse and each sample signal in said first or second sample signal series having said sample pulse time, wherein said sample obtaining means is selectively transitionable between an operative mode and an inoperative mode and selectively transitionable between a power consumption state and a power conservation state when in said operative mode, said sample obtaining means in said power conservation state throughout said time interval except for the duration of said sample pulse time when said sample obtaining means is in said power consumption state;

means for comparing each succeeding sample signal in said first sample signal series to a preceding sample signal in said first sample signal series to determine said decay rate of said first ring-generating pulse, comparing each succeeding sample signal in said second sample signal series to a preceding sample signal in said second sample signal series to determine said decay rate of said second ring-generating pulse, and comparing said decay rates of said first and second ring-generating pulses; and means for transitioning said ring-generating pulse generating means to said inoperative mode when a difference between said decay rates of said first and second ring-generating pulses exceeds a threshold level caused by the presence of an RFID device in a proximal space of said RF reader unit while maintaining said ring-generating pulse generating means in said operative mode when said difference between said decay rates of said first and second ring-generating pulses does not exceed said threshold level caused by the absence of said RFID device in said proximal space.

16. The RF reader unit of claim 15 further comprising means for generating an excitation signal selectively transitionable between an operative mode and an inoperative mode, wherein said transitioning means transitions said excitation signal generating means to said operative mode when said difference between said decay rates of said first and second ring signal series exceeds said threshold level while maintaining said excitation signal generating means in said inoperative mode when said difference between said decay rates of said first and second ring signal series does not exceed said threshold level.

* * * * *

UNITED STATES PATENT AND TRADEMARK OFFICE
CERTIFICATE OF CORRECTION

PATENT NO. : 6,476,708 B1
DATED : November 5, 2002
INVENTOR(S) : David A. Johnson It is certified that error appears in the above-identified patent and that said Letters Patent is hereby corrected as shown below:

Column 9,
Line 16, "flip/op switch" should read -- flip/flop switch --.

Column 11,
Line 40, "rates series exceeds" should read -- rates exceeds --.

Signed and Sealed this

Twenty-second Day of February, 2005

JON W. DUDAS
*Director of the United States Patent and Trademark Office*